United States Patent Office 3,562,371
Patented Feb. 9, 1971

3,562,371
HIGH TEMPERATURE GAS ISOSTATIC PRESSING OF CRYSTALLINE BODIES HAVING IMPERMEABLE SURFACES
Edward A. Bush, Painted Post, N.Y., assignor to Corning Glass Works, Corning, N.Y., a corporation of New York
No Drawing. Filed Oct. 16, 1968, Ser. No. 768,166
Int. Cl. C04b 35/64, 41/02
U.S. Cl. 264—65                                    11 Claims

ABSTRACT OF THE DISCLOSURE

Crystalline metal and ceramic bodies that have previously been sintered to the extent that the only porosity remaining in the body is closed porosity are isostatically hot pressed to a still higher density by surrounding the body which is maintained at sintering temperature with a gas at a pressure of at least 10,000 p.s.i. The gas must be inert to the body being pressed and must not permeate said body during the hot isostatic pressing step. While prior isostatic hot pressing processes have required the use of an impermeable container or an additional coating layer for the work piece neither are required in the present process.

BACKGROUND OF THE INVENTION

Field of the invention

The present invention relates generally to the manufacture of substantially totally densified, shaped, sintered ceramic, metallic and like bodies. More particularly, it relates to a method of fabricating such bodies, which method involves achieving final densification by isostatic hot pressing. Hot isostatic pressing, however, is not employed to impart shape to the body being fabricated.

Description of prior art

In the manufacture of shaped articles by the firing of compacted masses of sinterable particulate matter, it is ordinarily extremely difficult to attain essentially theoretical density, because of the difficulty of removing residual closed porosity for reasons hereinafter discussed. However, the attaining of near theoretical density, which is equivalent to elimination of residual closed porosity, is highly desirable from the general point of view of optimization of the physical properties of the shaped article. For example, essentially theoretically dense polycrystalline alumina bodies exhibit a significantly enhanced transparency relative to comparable bodies from which residual closed porosity has not been eliminated. The dielectric properties of ceramic bodies improve as such porrosity is removed. Similarly, the strength of such bodies is increased thereby.

Apparently only two methods of preventing or eliminating closed porosity in sintered bodies are known. The first involves the use of certain additives which function as grain growth inhibitors, as exemplified by the addition of a very small amount of magnesia to alumina or the addition of thoria to yttria. However, in many cases it may be desired to achieve the highest possible purity and additives, as impurities, may have deleterious effects. Furthermore, a given additive appears to be specific in its action; each sinterable material requires extensive investigation, largely empirical, of possible additives.

Hot pressing, in which high pressure is exerted on the sintering body, is generally effective to produce bodies of density approaching the theoretical. However, the method is limited to the forming of simple shapes. Moreover, because of the unidirectional mode of application of pressure, some slight variation in density may occur through the shaped body.

Cold isostatic pressing to consolidate particulate matter into shaped bodies has been practiced in the ceramic and powder metallurgical industries for many years. Stated most simply, it involves placing the particulate matter in a flexible mold of a solid material impervious to the fluid to be used for the application of pressure. The mold is provided with a closure having a valving means whereby entrapped air can be pumped from the interior of the mold. This latter operation subjects the mold and its contents to isostatic pressure approaching one atmosphere, compacting the contents to some extent and rigidifying the filled mold. The mold is then placed in a fluid in a pressure vessel. This is closed and additional fluid is pumped into the vessel, raising the pressure therein to a very high value. The pressure required depends, of course, on the nature of the particulate matter, its particle size, particle shape, particle size distribution and the green density desired.

It is understood that the pressure transmitting fluid may be a gas, although liquids are customarily employed.

Because pressure is applied equally and uniformly over the whole surface of the mass of particulate matter, the mass is compacted into a volumetrically smaller mass without distortion. The pressure is then allowed to return to atmospheric and the flexible mold and the formed body contained therein is removed from the pressure vessel and the flexible mold is stripped from the compacted formed article. Generally, the flexible mold is reuseable. The compacted formed article is then fired to densify it in conventional fashion.

By way of illustration, a rubber glove may be used as an example of a flexible mold of relatively complex shape. The final shape of the article produced through its use is, of course, that of the form from which the glove was produced, as by a latex dipping procedure. The article, however, will be considerably smaller than the form.

In relatively recent years the technique of hot isostatic pressing has been developed. This is, in essence, simply the conjoining of the above isostatic pressing with heating to sinter the compacted body to essentially theoretical density, the pressing and heating being carried out simultaneously. In this technique, a flexible mold is also employed. However, because of the temperature attained in the operation of the process, the mold obviously cannot be made of rubber or the like. Accordingly, a mold of a metal having a melting point higher than that attained must be employed. Furthermore, the metal must not be reactive with the material being pressed.

To illustrate the method of hot isostatic pressing, a thin-walled metal glove, comparable in size and configuration to the rubber glove previously mentioned, should be envisioned. This glove has an end closure member of the same thin metal, which is provided with a tubular member through which the particulate matter is added. This tubular member, after filling of the mold is complete, is connected to a vacuum system to remove as much as possible of the entrapped air. The tubular member is then pinched and welded shut.

The pressure vessel employed contains a generally centrally disposed heating chamber or furnace. The evacuated mold is placed interiorly of this furnace. The furnace is not, of course, a closed system. That is, the atmosphere therein communicates with that of the surrounding pressure vessel.

The working fluid, or pressure transmitting fluid, is an inert gas, such as nitrogen, helium or argon.

Heat and pressure are applied simultaneously for the length of time necessary to achieve interparticle bonding and the desired densification which may desirably be essentially complete. Thereafter, the pressure is released, the mold is allowed to cool and is then removed from the pressure vessel. The mold is then separated from the formed article. Obviously, the mold in this case is not reuseable.

It is apparent that the preparation of a thin-walled metal mold, particularly for a relatively complex shape, is a matter of some difficulty. This coupled with the fact that the mold is not reuseable, imposes certain limitations on the use of the method. The labor involved in the fabrication of one-use, intricately shaped molds adds significantly to the cost of articles produced thereby.

DESCRIPTION OF THE INVENTION

The present invention provides a method of fabricating sintered bodies of essentially theoretical density from particulate matter by a process which includes hot isostatic pressing as a step thereof. Furthermore, while a hot isostatic pressing step is involved, the method does not involve the use of a thin-walled metal mold. It therefore provides a method of manufacturing bodies of the described type which does not require the expensive and time-consuming forming of a non-reuseable flexible metal mold.

In brief, the present method comprises the steps of (a) forming a green body or compact of particulate material, (b) firing the green body for a time and at a temperature sufficient to densify the body to a point at which all open or interconnecting porosity communicating with the surface of the body has been eliminated and the only residual porosity is that resulting from isolated, closed pores within the body and (c) subjecting the fired body to hot isostatic pressing to remove residual porosity whereby to produce a body of essentially theoretical density.

Step (a) above, that of forming the green body, can be carried out in any of a number of ways familiar to workers in the ceramic, powder metallurgical and like arts. The above described isostatic pressing employing a rubber or similar mold is useful for the preparation of green bodies of complex shape. Slip casting may be the method chosen in certain cases, as may dry pressing and extrusion. The method described in U.S. Pats. No. 3,330,892 and 3,346,680 offer a convenient means of forming compacts of particulate material by transfer molding. Obviously, the choice of method will be dictated by many factors which will be evident to the skilled worker.

Firing of the green body, step (b) above, is preferably carried out in a vacuum or in an atmosphere of a gas, such as hydrogen, which, if trapped within the body, can readily diffuse into, or dissolve in the body with consequent elimination of pores. Firing in vacuum is, of course, generally to be preferred.

As is generally understood, the rate of densification on firing is a function of both time and temperature and, of course, depends also on the material being fired. This rate, however, is not linear with respect to time for any given temperature. That is, the rate of densification is greatest at the beginning of the firing cycle and the least late in the cycle when theoretical density is being approached.

However, it is known that, in the case of certain ceramic oxides, such as $Al_2O_3$, MgO and BeO, for a given temperature, grain size increases relatively slowly until a value of density is reached that is relatively close to theoretical and at which point essentially all open or interconnected porosity has been eliminated and only closed pores remain. Continuing the heating of the sintered body beyond this point in the firing cycle results in an abrupt and very large increase in the rate of grain size enlargement. In other words, secondary recrystallization occurs. As is well known, pores trapped in the resulting large grains are virtually impossible to remove. Continued firing beyond this point is ineffective to bring the body being fired to essentially theoretical density. Therefore, according to the present invention, firing is interrupted immediately before secondary recrystallization occurs.

Obviously, the point of interruption of firing will depend on the composition of the body being fired, the firing temperature, the presence of impurities, the nature of the impurities and like considerations. Of course, for certain materials of known purity, information in this respect is readily available in the literature. In any event, for a body of a given composition, it will be a relatively simple matter for the skilled worker to determine a firing schedule effective to give a body exhibiting only closed porosity and in which secondary recrystallization has not been initiated.

A body such as that immediately above described is allowed to cool in the furnace. Alternatively, it may be immediately removed therefrom if it is capable of withstanding the thermal shock of such removal. In any event, the body is placed in the heating chamber of a hot isostatic pressing apparatus. If cold, or partially cooled, it may be brought up to sintering temperature while simultaneously it is subjected to isostatic pressure exerted by an inert gas, although ordinarily the isostatic pressure is not applied until the maximum temperature has been reached. The temperature at which the hot isostatic pressing is conducted will ordinarily be that employed during the step of sintering the green body to the desired closed pore condition, although a somewhat higher temperature may be preferred.

The pressure exerted on the body being hot isostatically pressed according to the method of the invention will generally be approximately 10,000 p.s.i. However, considerably higher pressures may advantageously be employed. The practical upper limit of pressure is, of course, dictated by considerations of safety and will therefore depend on the design and construction of the pressure vessel employed.

It will be understood that the gaseous working fluid should be incapable of diffusing into or permeating the body being isostatically densified. Helium is generally employed as the gaseous working fluid, although other inert gases, such as argon or nitrogen may be substituted therefore.

It will be understood that the sintering of the preformed green body may be carried out in the hot isostatic pressing apparatus with the hot isostatic pressing following thereafter. However, it is a particular aspect of the method of the invention that it enhances the productive capacity of the very expensive hot isostatic pressing equipment, inasmuch as the time consuming operation of sintering to the point of elimination of open porosity may conveniently be carried out in a separate furnace.

The method of the invention is effective to form bodies from any particulate material that can be formed into a coherent green body and sintered in conventional fashion to a state impermeable to the gas employed in the isostatic press. Accordingly, the method may be used with refractory metals, refractory metal oxides, graphite, carbides, cermets and the like. The essentially complete densification of articles produced by the method results in products of markedly superior physical and mechanical properties relative to the same articles made by conventional sintering technique.

DESCRIPTION OF THE PREFERRED EMBODIMENT

Alumina powder of 99.9+ percent purity and having an average particle size of 0.3 micron is dry pressed at 20,000 p.s.i. to form a cylindrical pellet. This pellet is heated in a vacuum furnace for one hour at a temperature of 1650° C. under a pressure of 5 microns. The thus sintered sample displays approximately 3 volume percent porosity, essentially all of which is isolated from the sample surface. The average grain size is about 5 microns.

The sample is then placed in a hot isostatic press and is heated to about 1650° C. Helium gas is then admitted to the heated press chamber at a pressure of about 15,000 p.s.i. After one hour, the pressure is released and the sample is cooled to ambient temperature. The resulting alumina sample is found to have sintered to essentially theoretical density without substantial change in the average grain size.

I claim:
1. The process of fabricating a polycrystalline body by the steps of
   (a) forming a green body of particulate material
      (1) selected from the group consisting of crystalline ceramics and metals, and
      (2) that is sinterable to a densified state of being essentially free of interconnecting porosity communicating with the surface of the body while still containing closed porosity, and
   (b) firing said green body at sintering temperature and in an environment a gas diffusible with respect to the polycrystalline body to effect said densified state,
wherein the improvement, in combination with said steps, comprises
   (c) further densifying the fired body of simultaneously subjecting it to sintering temperature and the direct isostatic pressing action of a gas at a pressure of at least about 10,000 p.s.i., said gas being inert and nonpermeating with respect to said fired body.

2. The process of claim 1 wherein said particulate material is a crystalline ceramic material.

3. The process of claim 2 wherein said particulate material is an oxide ceramic material.

4. The process of claim 3 wherein said oxide ceramic material is alumina powder.

5. The process of claim 4 wherein said inert, nonpermeating gas is helium.

6. The process of claim 4 wherein said firing is carried out in hydrogen.

7. The process of claim 6 wherein said inert, nonpermeating gas is helium.

8. The process of claim 15 wherein said oxide ceramic material is alumina powder having an average particle size of 0.3 micron.

9. The process of fabricating a polycrystalline body by the steps of
   (a) forming a green body of particulate material
      (1) selected from the group consisting of crystalline ceramics and metals, and
      (2) that is sinterable to a densified state of being essentially free of interconnecting porosity communicating with the surface of the body while still containing closed porosity, and
   (b) firing said green body at sintering temperature and in an environment of vacuum to effect said densified state,
wherein the improvement, in combination with said steps, comprises
   (c) further densifying the fired body by simultaneously subjecting it to sintering temperature and the direct isostatic pressing action of a gas at a pressure of at least about 10,000 p.s.i., said gas being inert and non-permeating with respect to said fired body.

10. The process of claim 9 wherein said particulate material is an oxide ceramic material.

11. The process of claim 10 wherein said inert, non-permeating gas is helium.

References Cited

UNITED STATES PATENTS

| | | | |
|---|---|---|---|
| 3,284,195 | 11/1966 | Googin et al. | 75—226 |
| 3,419,935 | 1/1969 | Pfeiler et al. | 75—226 |
| 3,469,976 | 9/1969 | Iler | 75—204 |
| 2,745,713 | 5/1956 | Suits | 264—FPD |
| 3,219,736 | 11/1965 | Stisser | 264—332 |
| 3,279,917 | 10/1966 | Ballard et al. | 264—332 |
| 3,363,037 | 1/1968 | Levey, Jr., et al. | 264—125 |
| 3,405,207 | 10/1968 | Vahldiek | 264—125 |

OTHER REFERENCES

E. J. Smoke et al.: "Hydrogen and Vacuum Firing," an article appearing in the April 1965 issue of Ceramic Age at pp. 103–104.

J. E. Burke (Ed.), Progress in Ceramic Science, vol. 3, 1963, The Macmillan Company, New York, pp. 240–249.

JULIUS FROME, Primary Examiner

J. H. MILLER, Assistant Examiner

U.S. Cl. X.R.

75—221, 226; 264—66, 125, 332

UNITED STATES PATENT OFFICE
CERTIFICATE OF CORRECTION

Patent No. 3,562,371　　　　　　　　Dated February 9, 1971

Inventor(s) Edward A. Bush

It is certified that error appears in the above-identified patent and that said Letters Patent are hereby corrected as shown below:

Column 1, line 55, change "porrosity" to --porosity--.

Column 5, line 18, (Claim 1), after "environment" insert --of--.

Column 5, line 39, (Claim 8), change "15" to --11--.

Signed and sealed this 21st day of December 1971.

(SEAL)
Attest:

EDWARD M. FLETCHER, JR.　　　　ROBERT GOTTSCHALK
Attesting Officer　　　　　　　Acting Commissioner of Patent